United States Patent Office 3,337,907
Patented Aug. 29, 1967

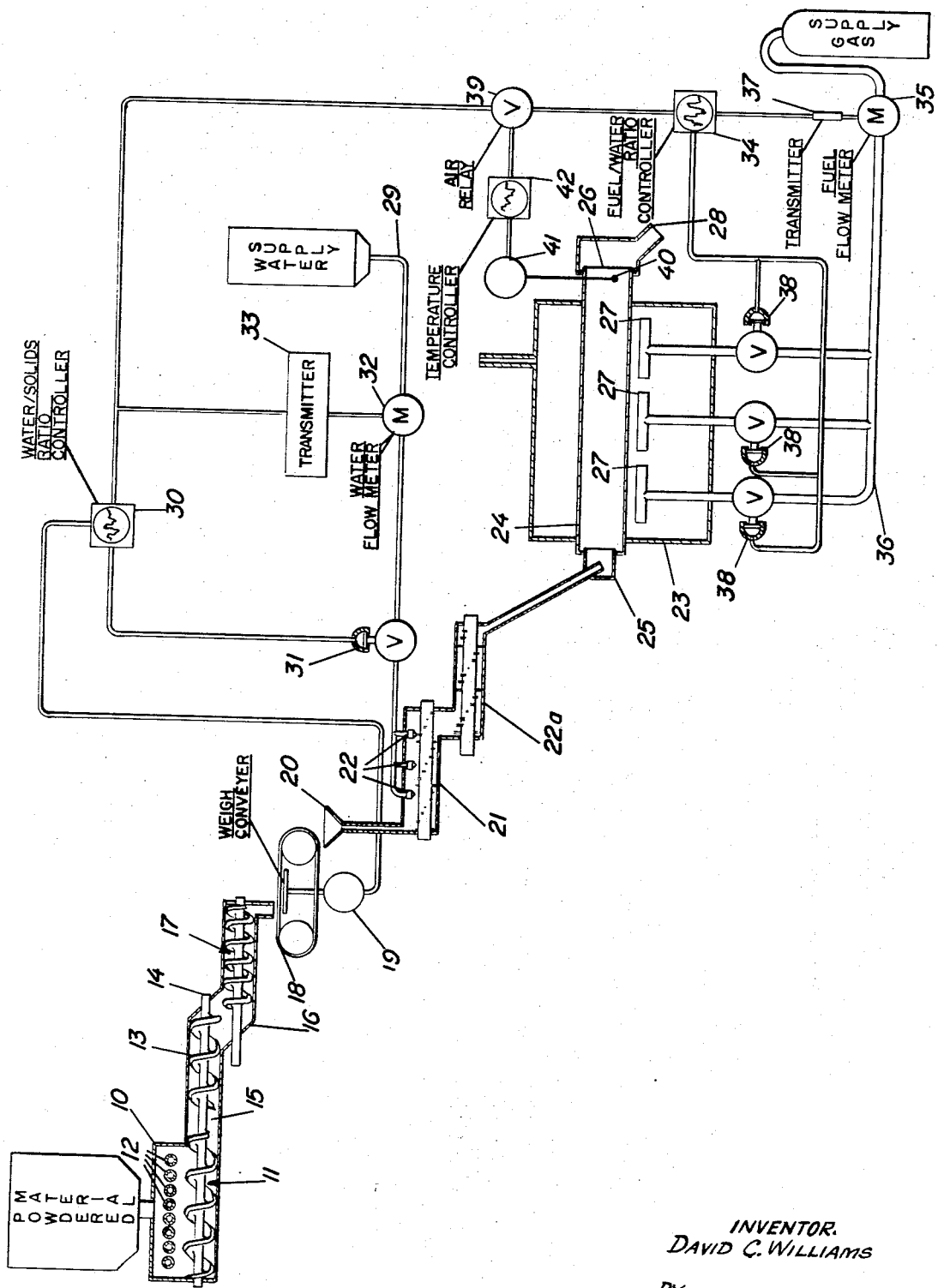

3,337,907
METHOD AND APPARATUS FOR AUTOMATIC MIXER AND DRYER CONTROL
David C. Williams, Aransas Pass, Tex., assignor, by mesne assignments, to Ashland Oil & Refining Company, Ashland, Ky., a corporation of Kentucky
Filed Apr. 18, 1961, Ser. No. 103,925
6 Claims. (Cl. 18—1)

This invention, in a specific embodiment, relates to an improved process and apparatus for agglomerating or pelleting loose carbon black, with particular emphasis upon the control and correlation of such process variables as the weight of the various components, heating conditions, desired properties of the product, etc. From a broader point of view this invention relates to methods and apparatus for automatically regulating the proportionate admixture of two or more materials at one stage of a process and the automatic adjustment of the heat to a subsequent stage of the process in accordance with predetermined operating ratios.

It is well known that many materials are handled with greater facility when in agglomerated form as opposed to powdered form. Manufactuers of powdered material have found that the marketability of the powdered material they produce is enhanced by agglomeration because of the desire of many material buyers to purchase it in a form more convenient to handle. Therefore, it has become a common practice to subject such materials to a treatment which is able to build up many small particles of powder into a lesser number of larger aggregates. One method of agglomerating a loose powdery material is to add a liquid to it, so that upon subsequent treatment by any of the well-known methods for producing agglomerates, such as rolling, tumbling, pelletizing, agitation, granulation, "Spheronizing," extrusion, etc., a dense uniform agglomerate, pellet or granule of the desired size will result. Examples of suitable liquids include oils, water and others. It may also be found desirable to include surfactants along with the liquid. Hereinafter the terms "pelletizing" and "pellet" should be interpreted to encompass any or all of the above-mentioned physical methods of bringing about the intimate compaction of powdery materials in agglomerated form as well as the agglomerated products of any or all of such processes.

The percentage of pelletizing liquid used, based on the amount of powder being treated, is an important factor since the range of liquid content which encourages agglomeration into pellets is somewhat limited. The proportion of pelletizing liquid to be added to a powdery material is determined in part by the kind of material being pelleted, the moisture content of the powdered material prior to the addition of the pelletizing liquid and the nature of the pelletizing process. Because the range of acceptable liquid content for any given material and process is limited, it has been found necessary, in continuous production processes, for the process operator to maintain continuous surveillance over the rate of liquid addition and to adjust said rate frequently.

After the pellets have been formed, it is customary practice to remove at least a part of the pelletizing liquid from the pellets by drying to an extent which is determined by such factors as pellet density, the intended use of the pellets and the material of which the pellets are composed. Because of process variables such as the amount of material undergoing drying, the moisture content of the material prior to the addition of pelletizing liquid and changes in operating conditions, it is usually necessary to adjust the drying heat about as often as the flow of pelletizing liquid. Without the aid of automatic control of dryer heat, an operator must keep the drying operation under substantially continuous surveillance. In actual practice it has been found necessary to make such adjustments every five to ten minutes. The provision of effective automatic control means for the addition of materials to the process in correct amounts and for the regulation of dryer heat in accord with the varying requirements of the process and materials could obviously result in considerable savings of man power, fuel and expense.

Accordingly, the objects of this invention are as follows:

(1) To provide improved means for governing the amount of fuel utilized in a heating operation;

(2) To provide means for controlling the production of heat in a heating zone in response to variations in the rate at which a material to be heat treated enters said heating zone;

(3) To provide means for varying the production of heat in a heating zone in response to changes in the amount of insufficiently heated material which leaves said heating zone per unit of time;

(4) To provide means for governing the quantity of heat generated in the heating step of a process by measuring subsequent to or during heat treatment a property of the material being treated which is indicative of the rate of heat production necessary for the efficient completion of said heating step;

(5) To provide apparatus for governing a process involving continuous wet-mixing and heating of materials;

(6) To provide apparatus for maintaining the fuel input of a dryer in a predetermined relationship to the fluid content of material being charged into said dryer;

(7) To provide means for controlling the ratio between the rate of feeding material to a dryer and the rate of fuel flow to said dryer in response to changes in the temperature at which material is discharged from said dryer;

(8) To provide apparatus for automatic control of the production of agglomerates from powdery materials wherein a liquid is added to said materials to aid agglomeration and removed in a dryer after agglomeration has been effected, the rate of heat production in said dryer being regulated automatically in response to the amount of liquid present in the agglomerated material prior to drying.

Other objects and advantages of the invention will become apparent from a further consideration of the following disclosure and attached drawing.

We have found that the objects of this invention are fulfilled by a pelletizing system, comprising: automatic means for mixing pelletizing fluid and powdery material in a predetermined proportion and for forming pellets therefrom; a dryer adapted to receive the pellets, to dry them and to discharge them, said dryer having a heating element and a fuel supply conduit for connecting the heating element with a fuel supply, said conduit being provided with fuel flow rate sensing and regulating means; and fuel/pelletizing fluid ratio control means, associated with said fuel flow sensing and regulating means and responsive to the rate at which pelletizing fluid is mixed with a powdery material, for maintaining a predetermined ratio between said rates.

The above combination of elements is adequate to fulfill the objects of the invention under most conditions. However where a finer degree of control is desired or where the amount of heat required in the process is substantially affected by variables other than the material flow rate, one or more additional elements may be combined with the above-named elements. For example the additional measure of control may be obtained in accordance with our invention by adding to the five elements above.

Means associated with the dryer and fuel/pelletizing fluid ratio control means for detecting load changes within the system by measuring the temperature of pellets discharged from the dryer and for altering the fuel/pelletizing fluid ratio to compensate for such load changes.

Reference is now made to the accompanying drawing for a specific illustration of the invention. This drawing and the following description are specifically directed to a carbon black pelleting process but it is to be understood that the invention is not limited thereto.

The dry, fluffy product of any well-known method of producing carbon black is introduced into a surge tank 10. The powdery material is then steadily withdrawn, at a rate subject to adjustment, from the surge tank by means of a first screw conveyor 11. In order to prevent bridging of the material within the surge tank and consequent irregularities in its removal therefrom by the conveyor 11, air pads 12 may be utilized to maintain the material in a uniformly fluidized state.

In the screw conveyor 11 a section of the flighting 13 is preferably removed from shaft 14 to leave a portion 15 of said shaft free of flighting. During the operation, the conveyer will become filled or packed at 15 where the flighting has been removed. This is due to the fact that material reaching the shaft portion 15 can only be removed from the area of such shaft portion 15 when sufficient material is available from the surge tank side of the conveyor to push the material at 15 to the point at which the flighting is resumed. Provided that the removed section of flighting is long enough, the material in the area of shaft portion 15 will form a plug of moving material which effectively functions as a seal between the surge tank 10 and the parts of the conveyor to the right of shaft portion 15.

Conveyor 11 discharges through a chute 16 to a second conveyor 17 which transports the solid material at a somewhat faster rate than the conveyor 10 and feeds a relatively smooth flow of carbon black to a weighing device. Any suitable type of weighing device may be employed but we prefer to utilize a weight belt conveyor 18 which includes a pneumatic air transmitter 19.

The material discharged from the weigh belt conveyer enters the inlet hopper 20 of a suitable mixer 21, such as the pin shaft type pellet mill illustrated. Within the mixer 21 are located one or more spray heads 22 through which the pelletizing liquid can be introduced. In the case of carbon black the pelletizing liquid is usually water, and accordingly water will be referred to as the pelletizing liquid in this example. One or more additional mixing stages, such as in the mixer 22a may be employed if desired. A pelletizer or extruder (not shown) may also be used to process the product of the mixer 22a.

The admixture of carbon black and water may then be fed into a rotating externally fired dryer 23 having a substantially horizontal cylindrical drum 24 which is adapted to rotate about its major axis and to receive the water and carbon black mixture through the inlet 25. As the wet carbon black mixture passes from the inlet 25 through the drum 24 to the downstream end 26, the drum is heated externally by heating elements or burners such as the gas burners 27. The temperature and length of treatment of the wet carbon black mixture in the drum are regulated in such a manner as to yield agglomerates, pellets or granules of the desired moisture content. The dried pellets or granules are then discharged from a chute 28 into any suitable conveyor, storage or packaging unit, not shown.

The ratio control system which continuously and automaticaly regulates the addition of water through the spray heads 22 and water pipe 29 in proportion to the weight of material crossing the weighing conveyer and entering the mixer 21, comprises the following elements: the weigh conveyer 18; linear transmitter 19; water/solids ratio controller 30; motor valve 31 in the water pipe 29; water flow sensing means, such as an orifice meter 32 in water pipe 29; and a transmitter 33 therefor. One input of the water/solids ratio controller 30 is connected to the output of the transmiter 19, which produces a weight signal which is a linear function of the amount of material present in the conveyer 18 at any given moment. The other input of the controller 30 receives a linear water flow signal from transmitter 33. The orifice meter 32 measures the flow in pipe 29 as a differential. Therefore, the transmitter 33 must be of the type which converts a differential input into a linear output. Any suitable type of flow sensing means and transmitter which are capable of being matched with controler 30 may be used. However, we prefer here, as in the case of the weigh conveyer transmitter, to utilize a pneumatic transmitter which transmits a linear signal such as a Bailey-Ledoux-Bell transmitter or the like.

The controller 30, which may be selected from any of those controller-receiver instruments which include ratio control such as the Brown two-pen pneumatic receiver-recorder, is set so that the signals from the transmitters 19 and 33 in balance whenever the weight of material on conveyer 18 and the flow in pipe 29 are such that the correct proportions of water and carbon black are combined in the mixer 21. Whenever the selected water to carbon black ratio is upset, the controller 30 causes a change of air pressure to occur over the diaphragm in motor valve 31 to increase or decrease the flow of fluid in pipe 29 until the signals from transmitters 19 and 33 are again in the correct proportional balance. This is the first stage of control in this embodiment of our invention.

As varying amounts of carbon black enter the mixer 21, an automatically regulated proportional amount of water is added thereto through spray heads 22. During the course of normal operations the rate of carbon black addition and consequently the ratio of water addition will fluctuate sufficiently so that alterations must be made from time to time in the dryer heat if a uniformly dried pelleted product is to be obtained. The necessary regulation of dryer fuel flow as a function of the rate of water addition constitutes the second stage of control in our system and is accomplished in part by a system which includes the following elements: water flow meter 32, transmitter 33, fuel/water ratio controller 34, fuel flow meter 35, main fuel supply conduit 36, transmitter 37 and one or more diaphragm motor valves 38 in subsidiary fuel supply conduits for the dryer burners 27.

The controller 34 like the controller 30 is preferably a pneumatic receiver-recorder with ratio control and fixed Indexet. One input of the controller 34 receives linear water signals from transmitter 33 through an air relay 39 such as the Sorteberg Model B, Type R. The other input of controller 34 receives linear signals from the transmitter 37 which is operatively associated with fuel flow sensing means 35, preferably an orifice plate type flow meter. The transmitter 37 should be of a type which transmits a pneumatic signal which is a linear function of the fuel flow in conduit 36. Controller 34 is set up so that when the fuel flow is sufficient to produce the amount of heat necesary to dry the pellets to desired specifications, the signals from transmitters 37 and 33 will be in balance. As the rate of water addition increases and decreases from time to time in response to changing rates of carbon black addition to mixer 21, the ratio in controller 34 will be upset by the varying signal from transmitter 33 which monitors the water flow. Whenever such upset occurs, the controller 34 signals pneumatic motor valves 38 and causes them to open or close until the proper ratio of fuel flow to water addition is restored.

As explained above, the delivery of water to the mixer 21 is automatically altered in response to the weight of carbon black charged to the mixer 21 per unit of time. The dryer heat, in turn, is regulated by the rate of water addition. Provided that fixed ratios of water to solids and fuel to water could be selected which would yield a properly dried product under all operating conditions, nothing more would be needed to set up a fully effective automatic system. However, the presence of certain variables in the carbon black pelleting art makes it exceedingly difficult if not impossible to select a fixed ratio of fuel to water which will always yield to desired percentage of moisture in the pelleted product. Such factors as the heating value of a unit volume of fuel, the moisture content of the carbon black before the addition of pelletizing fluid, variations in the thermal efficiency of the dryer due to outside temperature changes, etc. are not constant. Therefore a third stage of control is often required.

The third stage of control comprises: a carbon black pellet temperature sensing device 40 at or near the discharge end of the dryer drum 24; a temperature signal transmitter 41; a temperature recorder-controller 42 and the air relay 39. In most drying processes it will be possible to ascertain from changes in product temperature whether drying is or is not proceeding according to specifications. When the temperature of the product being discharged from the dryer exceeds the temperature or temperature range which is characteristic of proper drying, it is an indication that there has been a load change within the system requiring a reduction in the flow of fuel to the burners 27. Conversely, if the above-mentioned characteristic temperature is in excess of the current temperature at which the product is being discharged from the dryer, it is an indication that the flow of fuel to the dryer should be increased in order to maintain the proper rate of drying the pellets.

Accordingly, the temperature recorder-controller 42 registers signals of temperature changes in the product coming from the sensing means 40 and transmitter 41. The output of the temperature control instrument 42 is fed through the air relay 39 to controller 34 to bias or de-bias the signal passing from transmitter 33 to controller 34. The resultant modification of the signal from transmitter 33 to controller 34 effectuates an automatic internal adjustment of the fuel to water ratio by and within the system for the duration of the load change requiring such adjustment.

The operation of this embodiment of our invention may be summarized substantially as follows:

By the above-stated means, a varying flow of powdered material can be automatically treated with a predetermined ratio of water prior to or during its agglomeration in the pelletizing machinery. The system uses the weight of powdered material, as measured by a weigh conveyer, to obtain a linear weight signal which is fed into one input of a ratio controller. The ratio controller receives a linearized water flow signal through its other input from a transmitter operatively associated with a flow measuring means in the water pipe. The output of the ratio controller exerts a proportional-positioning action upon a diaphragm motor valve in the water pipe. The weigh conveyer, flow meter, transmitter, ratio controller and motor valve constitute a ratio control system which keeps the addition of water continuously in step with the amount of solids crossing the weigh conveyer.

As the amount of powdered material deposited upon the weigh conveyer fluctuates, proportional changes are automatically made in the rate at which water is introduced. Since the fuel demands of the dryer are to a substantial extent a function of the amount of water which must be evaporated therein, such fluctuations in the amount of water necessitate frequent adjustments of the flow of fuel to the dryer. Such adjustments are accomplished automatically with the aid of the fuel/water ratio controller which, like the water/solids ratio controller, is actuated by the upset of a predetermined ratio set up in the controller. One input of the fuel/water ratio controller receives linear signals from the water flow meter by way of the linearizing transmitter connected thereto. The other input of the last-mentioned controller receives linear signals from the transmitter connected to the flow sensing means in the fuel conduit. The output of said controller acts through a fuel flow regulation motor valve to restore the predetermined ratio of fuel to water whenever changes in water flow or fuel supply pressure upset the fuel/water ratio.

From time to time load changes may take place within the system requiring a temporary adjustment of the fuel/water ratio. The necessity for such temporary adjustments is usually indicated by a change in the temperature at which dried pellets are discharged from the dryer. Therefore, means for sensing the change in the dried pellet temperature are associated with the relay interposed between the water flow meter transmitter and the fuel/water ratio controller. With the aid of the relay, signals from the dried pellet temperature sensing means are combined with the water flow signal to the fuel/water ratio controller. Through this arrangement, load changes within the system, as reflected by changed temperatures of dried pellet discharge, are able to impress a bias upon the signal to the fuel/water ratio controller in order to temporarily alter the fuel-to-water ratio and produce the changed drying conditions needed to maintain product specifications during the duration of the load change.

It should be obvious to those skilled in the art that there would be no departure from the scope of this invention in substituting for the above-mentioned controllers, sensing devices, motor valves and transmitters, other controllers, sensing devices, motor valves and transmitters which communicate by means of electrical signaling, hydraulic signaling or any type of signaling other than the pneumatic signaling illustrated as representative. It is also quite obvious that there would be no departure from the scope of this invention in substituting electrical heaters or oil-burning heaters for the gas burners illustrated herein and the term fuel should be understood to embrace electric power in such case. Nor would there be any substantial departure from the spirit of this invention in retaining the essence of our automatic system of control while using it in connection with some process other than pelletizing or agglomerating.

It is obvious that the scope of this invention is broad and far-reaching. It may be applied to many processes other than agglomerating or pelletizing processes. For example, it is believed that the principles of this invention might well be applied to any process wherein two or more materials are admixed and thereafter subjected to heat treatment. Therefore, it should be understood that the illustrative details set forth herein are merely explanatory in purpose and should not be construed as unnecessarily limiting the invention.

Having described my invention and a specific embodiment thereof I claim:

1. Apparatus for continuously forming and drying carbon black pellets, said apparatus comprising:
   (a) means for forming pellets;
   (b) carrying means including a conveyor for carrying carbon black powder from a source thereof to said means for forming pellets;
   (c) a first transmitter including weighing means associated with said conveyor for weighing the carbon black present on said conveyor and for producing a weight signal which varies in accordance with and is representative of the varying weights of carbon black present on the conveyor;
   (d) a water conduit having a discharge outlet stationed adjacent a point on said carrying means for adding pelletizing fluid to said carbon black;
   (e) a first motor valve in said pelletizing fluid conduit;
   (f) a second transmitter, including pelletizing fluid flow sensing means in said pelletizing fluid conduit, for continuously measuring the flow of pelletizing fluid in said conduit and for generating a signal representative of the volume rate at which pelletizing fluid is being added to the carbon black;
   (g) a pelletizing fluid/carbon black ratio controller connected with said first and second transmitters and operatively associated with said motor valve to rereceive signals from said transmitters and to open and close said motor valve as the amount of carbon black on said conveyor varies in order to maintain a predetermined ratio between the weight of carbon black and the flow of pelletizing fluid;

(h) means for drying pellets, including a heat treatment chamber, burners to heat said chamber and a fuel conduit to supply said burners;

(i) a second motor valve in said fuel conduit;

(j) a third transmitter, including fuel flow sensing means in said fuel conduit for continuously measuring the flow of fuel in said conduit and for generating a signal representative of the volume rate of fuel flow in said conduit;

(k) a fuel/pelletizing fluid ratio controller connected with said second and third transmitters and operatively associated with said second motor valve to receive signals from said second and third transmitters and to open and close said second motor valve as the rate of pelletizing fluid addition varies in order to maintain a predetermined ratio between the flows of gas and pelletizing fluid into the apparatus;

whereby the correct ratio may be maintained between the amounts of carbon black and pelletizing fluid and between the amounts of pelletizing fluid and gas entering the apparatus to produce pellets of uniform moisture content.

2. Apparatus according to claim 1 comprising a fourth transmitter including temperature sensing means located in the downstream end of said heat treatment chamber, said fourth transmitter being connected to said fuel/water ratio controller as is said second transmitter, said fourth transmitter being adapted to generate a signal representative of variations of temperature in the pellets leaving said chamber, and to relay said signal to said fuel/water ratio controller where it is impressed upon the signal from said second transmitter to alter the fuel-water ratio in response to load changes in the apparatus manifested as variations in the temperature of carbon black leaving the dryer.

3. A continuous pelletizing system, comprising: automatic means for mixing pelletizing fluid and powdery material in predetermined proportion and for forming pellets therefrom; a dryer adapted to receive the pellets, to dry them and to discharge them, said dryer having a heating element and a fuel supply conduit for connecting the heating element with a fuel supply, said conduit being provided with fuel flow rate sensing and regulating means; and fuel-pelltizing fluid ratio control means, associated with said fuel flow sensing and regulating means and responsive to the rate at which pelletizing fluid is mixed with the powdery material, for maintaining a predetermined ratio between said rates.

4. A system according to claim 3 wherein there are means associated with the dryer and fuel/pelletizing fluid ratio control means for detecting load changes within the system by measuring the temperature of pellets discharged from the dryer and for altering the fuel/pelletizing fluid ratio to compensate for such load changes.

5. A system according to claim 3 wherein said automatic means include: feeding means adapted to feed a relatively smooth flow of powdery material; a weigh conveyor associated with the feeding means to receive the powdery material and weigh it; a pellet mill associated with the weigh conveyor to receive the powdery material therefrom; a pelletizing fluid conduit connected with a source of pelletizing fluid and having an outlet in the mill; a motor valve in the conduit; a flow meter in the conduit; transmitter means associated with the flow meter for producing a signal which is linearly proportional to the rate of flow of pelletizing fluid in the conduit; transmitter means associated with the weigh conveyer for producing a linear weight signal; and a pelletizing fluid/powdery material ratio control means connected with the transmitters and motor valve for opening and closing the valve and maintaining a predetermined ratio between the rates at which powdery material and pelletizing fluid enter the system.

6. A continuous pelletizing system, comprising: automatic means for mixing pelletizing fluid and powdery material and for forming pellets therefrom; a dryer adapted to receive the pellets, to dry them and to discharge them, said dryer having a heating element and a fuel supply conduit for connecting the heating element with a fuel supply, said conduit being provided with fuel flow rate sensing and regulating means; and fuel/pelletizing fluid ratio control means, associated with said fuel flow sensing and regulating means and responsive to the rate at which pelletizing fluid is mixed with the powdery material, for maintaining a predetermined ratio between said rates.

References Cited

UNITED STATES PATENTS

| | | | |
|---|---|---|---|
| 1,988,677 | 1/1935 | Arnold. | |
| 2,304,382 | 12/1942 | Shoeld | 18—1 |
| 2,420,415 | 5/1947 | Bristol | 137—94 |
| 2,570,808 | 10/1951 | Hermes | 34—48 |
| 2,641,848 | 6/1953 | Wilson | 34—48 |
| 2,800,399 | 7/1957 | King | 18—1 |
| 2,962,763 | 12/1960 | Brasch | 18—1 |
| 3,017,662 | 1/1962 | Marsh | 18—1 |
| 3,056,162 | 10/1962 | Fisher | 18—1 |

WILLIAM J. STEPHENSON, *Primary Examiner.*

A. B. ENGELBERG, C. N. SHANE, *Assistant Examiners.*